(12) United States Patent  
Yin et al.

(10) Patent No.: US 9,180,484 B2  
(45) Date of Patent: Nov. 10, 2015

(54) MAGNETICALLY RESPONSIVE PHOTONIC NANOCHAINS

(75) Inventors: Yadong Yin, Riverside, CA (US); Yongxing Hu, Riverside, CA (US); Le He, Riverside, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 0 days.

(21) Appl. No.: 14/003,642

(22) PCT Filed: Mar. 7, 2012

(86) PCT No.: PCT/US2012/027977  
§ 371 (c)(1),  
(2), (4) Date: Sep. 19, 2013

(87) PCT Pub. No.: WO2012/122216  
PCT Pub. Date: Sep. 13, 2012

(65) Prior Publication Data  
US 2014/0004275 A1 Jan. 2, 2014

Related U.S. Application Data

(60) Provisional application No. 61/449,980, filed on Mar. 7, 2011.

(51) Int. Cl.
| | |
|---|---|
| *B82Y 40/00* | (2011.01) |
| *B05D 3/00* | (2006.01) |
| *B82Y 30/00* | (2011.01) |
| *H01F 1/00* | (2006.01) |

(52) U.S. Cl.  
CPC ............... *B05D 3/207* (2013.01); *B82Y 30/00* (2013.01); *B82Y 40/00* (2013.01); *H01F 1/0072* (2013.01)

(58) Field of Classification Search  
None  
See application file for complete search history.

(56) References Cited

U.S. PATENT DOCUMENTS

| 7,332,101 B2 | 2/2008 | Singh et al. | |
|---|---|---|---|
| 2001/0007312 A1* | 7/2001 | Siddiqi | 210/695 |
| 2005/0285073 A1* | 12/2005 | Singh et al. | 252/62.54 |
| 2005/0286342 A1* | 12/2005 | Garcia et al. | 366/273 |
| 2006/0248945 A1* | 11/2006 | Gleich | 73/53.01 |
| 2009/0053512 A1* | 2/2009 | Pyun | G11B 5/712 428/336 |

FOREIGN PATENT DOCUMENTS

| WO | WO 2009/017525 A2 | 2/2009 | |
|---|---|---|---|
| WO | WO2009017525 | * 2/2009 | B82Y 30/00 |
| WO | WO 2010/096203 A2 | 8/2010 | |

OTHER PUBLICATIONS

Ammar et al. "Synthesis and characterization of core-shell structure silica-coated FeNi nanoparticles" 2007.*

(Continued)

*Primary Examiner* — Mandy Louie  
(74) *Attorney, Agent, or Firm* — Buchanan Ingersoll & Rooney PC

(57) ABSTRACT

Magnetically responsive photonic nanochains that have been produced by inducing chaining of uniform magnetic particles during their silica coating process and then allowing additional deposited silica to wrap entire structures. The optical diffraction of these nanochains can be switched on and off by applying magnetic fields.

20 Claims, 4 Drawing Sheets

(56) References Cited

OTHER PUBLICATIONS

Yan et al. "Facile preparation of superparamagnetic Fe2O4/Poly(St-co-MPS)/SiO2 Composite particles with high magnetization by introduction of silanol groups" Jou. of Nanoscience and nanotechnology Vo. 9, 574-5879, 2009.*

Salgueirino-Maceira et al. "One-dimensional assemblies of silica-coated cobalt nanoparticles: Magnetic pearl necklaces" Jou. of magnetism and Magnetic Mat. Vo. 303. Iss. 1. p. 163-166, Aug. 2006.*

International Search Report (PCT/ISA/210) mailed on May 31, 2012, by the U.S. Patent Office as the International Searching Authority for International Application No. PCT/US2012/027977.

Extended European Search Report issued Oct. 21, 2014 in corresponding European Patent Application No. 12 75 5693.

Yongxing Hu et al., "Magnetically Responsive Photonic Nanochains", Angew. Chem. Int. Ed., pp. 3747-3750, published online: Mar. 14, 2011.

* cited by examiner

MAGNETICALLY RESPONSIVE PHOTONIC NANOCHAINS

STATEMENT REGARDING FEDERALLY SPONSORED RESEARCH OR DEVELOPMENT

This invention was made with Government support under Grant No. DMR0956081, awarded by the National Science Foundation, and Grant No. W911NF-10-1-0484, awarded by the Army/ARO. The Government has certain rights in this invention.

FIELD OF THE INVENTION

The present invention relates to magnetically responsive photonic nanochains that have been produced by inducing chaining of uniform magnetic particles during their silica coating process and then allowing additional deposited silica to wrap entire structures. The optical diffraction of these nanochains can be switched on and off by applying magnetic fields.

BACKGROUND OF THE INVENTION

Responsive photonic materials are of great interest due to their broad applications relevant to the controlling of colors. Being efficient and inexpensive, colloidal self-assembly has been widely studied for the fabrication of photonic crystal structures, especially for applications that can tolerate defects. While many studies have focused on tuning the refractive index of the components or the periodicity by incorporating active materials that can respond to environmental changes, in accordance with an exemplary embodiment a magnetically tunable photonic structure by assembling uniform superparamagnetic (SPM) colloidal particles into one-dimensional (1D) chain-like arrays in various liquid media has recently been developed. The dynamic ordering of the magnetic colloids with controllable periodicity along the direction of the external field renders the system a fast, fully reversible photonic response across the visible-near-infrared spectrum. By taking advantage of the magnetic property, in accordance with another exemplary embodiment, a tunable photonic materials whose properties can be manipulated by changing their orientation with external fields has been developed. This was achieved by embedding aligned chains of periodically arranged SPM particles in polymer microspheres so that their relative orientation and correspondingly the diffraction property can be tuned by rotating the external magnetic fields. The division of bulk photonic crystals into many small units tens of micrometers in size brings the benefits of easy fabrication, actuation and broader applications, as the color of these units can be controlled individually or collectively as needed by using external magnetic fields. It can be appreciated that to extend this principle to the fabrication of magnetically responsive photonic structures with significantly reduced dimensions so that color manipulation with higher resolution can be realized has be achieved. The ideal case is to fix individual magnetic particle chains. This will produce the smallest possible photonic nanostructures that can effectively diffract at visible spectrum. In addition to color displays, these optically active magnetic nanochains may find great use in fields such as bio- and chemical sensing and biomedical labeling and imaging.

SUMMARY

In accordance with an exemplary embodiment, a method of fabricating individually fixed nanochains with a magnetically responsive photonic property comprises: coating a plurality of colloidal nanoclusters (CNS) with a layer of silica; applying a magnetic field to the plurality of colloidal nanoclusters to assemble the colloidal nanoclusters into photonic chains; and overcoating the photonic chains with an additional layer of silica.

The details of one or more embodiments of the disclosure are set forth in the accompanying drawings and the description below. Other features, objects, and advantages will be apparent from the description and drawings, and from the claims.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DETAILED DESCRIPTION

In accordance with an exemplary embodiment, a convenient and flexible approach for the fabrication of individually fixed nanochains with a magnetically responsive photonic property by combining magnetic assembly with sol-gel processes. The method involves initially coating the superparamagnetic $Fe_3O_4$ colloidal nanocrystal clusters (CNCs) with a thin layer of silica, assembling them into chains by applying a magnetic field, and further overcoating the chains with an additional layer of silica to stabilize the chain structure. The key is to induce the chaining of the magnetic particles by brief exposure to external fields during the silica coating process so that the particles temporarily stay connected, allowing additional silica deposition to fix the chains into mechanically robust rods or wires. The process is highly controllable: the periodicity can be varied by using $Fe_3O_4$ CNCs of different sizes, the interparticle spacing can be fine-tuned by adjusting the timing of magnetic field exposure, and the length of the chains can be controlled by changing the duration of the magnetic field exposure. The resulting photonic chains disperse randomly in solution in the absence of a magnetic field, but align themselves and show diffraction color instantly when an external field is applied. The fixed photonic nanochains exhibit long-term structural/optical stability and can be conveniently incorporated into many liquid or solid matrices.

Figure 1:
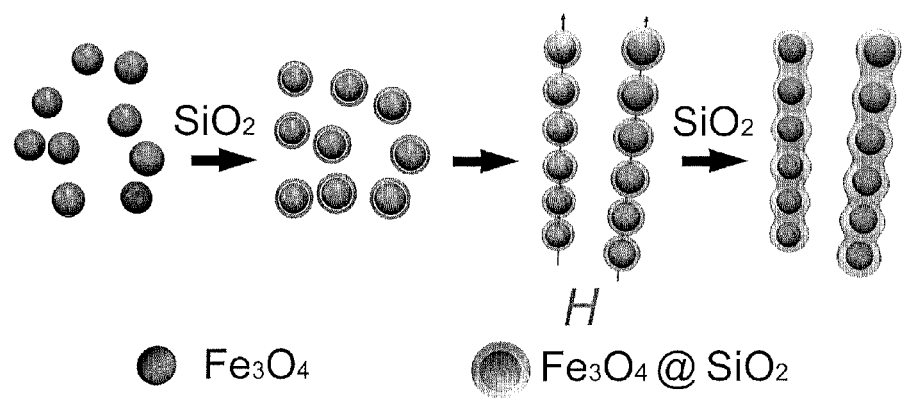
FIG. 1 shows a schematic illustration of the fabrication process of the fixed 1D nanochains containing periodically arranged $Fe_3O_4$ particles. The key is to induce chaining of the uniform magnetic particles by a brief magnetic exposure during the silica coating process and then allow additional silica deposition to further stabilize the chain structures. The timing and duration of magnetic exposure can be used to conveniently control the length and periodicity of the nanochains.

FIG. 1 illustrates the fabrication process for the $Fe_3O_4$@$SiO_2$ photonic chains. $Fe_3O_4$ CNCs are synthesized using a high-temperature hydrolysis reaction. After cleaning, the aqueous dispersion of $Fe_3O_4$ particles is mixed sequentially with ammonium hydroxide ($NH_4OH$) and ethanol. Since the $Fe_3O_4$ CNCs are covered with a layer of polyacrylate (PAA), they tend to aggregate in ethanol, which can be temporarily broken up under sonication. Tetraethoxysilane (TEOS) is injected after the dispersion is quickly transferred into a flask under mechanical stirring. Upon hydrolyzation and condensation, a thin layer of silica starts to deposit on the surface of the $Fe_3O_4$ particles, gradually improving their dispersity in ethanol. If the silica layer is allowed to continuously grow beyond 20 nm in thickness, the resulting $Fe_3O_4$@$SiO_2$ core-shell particles become highly dispersible in ethanol solutions. However, if a magnetic field is applied during the initial stage of silica coating, the magnetic dipole-dipole interaction brings the particles together to form 1D (one-dimensional) chains. Due to their low dispersibility, the particles tend to remain in the linear chain structure even after the external field is removed. The connection between neighboring particles may also be enhanced through the condensation reaction of surface silanol groups on the growing silica surface. Continued deposition of silica covers the entire surface of each chain, producing peapod-like structures with further increased mechanical stability. The final products are 1D chains containing periodically arranged uniform $Fe_3O_4$ CNCs which can effectively diffract visible light.

The strength of magnetic field is an important parameter for the successful fabrication of photonic nanochains. The magnetic field should be strong enough to induce chaining of magnetic particles and overcome the electrostatic force to ensure close contact of neighboring particles before additional silica coating. In accordance with an exemplary embodiment, the required field strength decreases with increasing size of magnetic CNCs. For medium sized (approximately 160 nm) particles, a field strength of 570 G is used. If the field strength is too high (>900 G), the magnetic particles will aggregate immediately into large objects without retaining the chain structure. In addition, a uniform magnetic field is required for producing photonic chains with uniform lengths. This has been achieved by simply using the central portion of a large diameter disk magnet, although further improved field uniformity might be possible with specially designed electromagnets.

Figure 2:
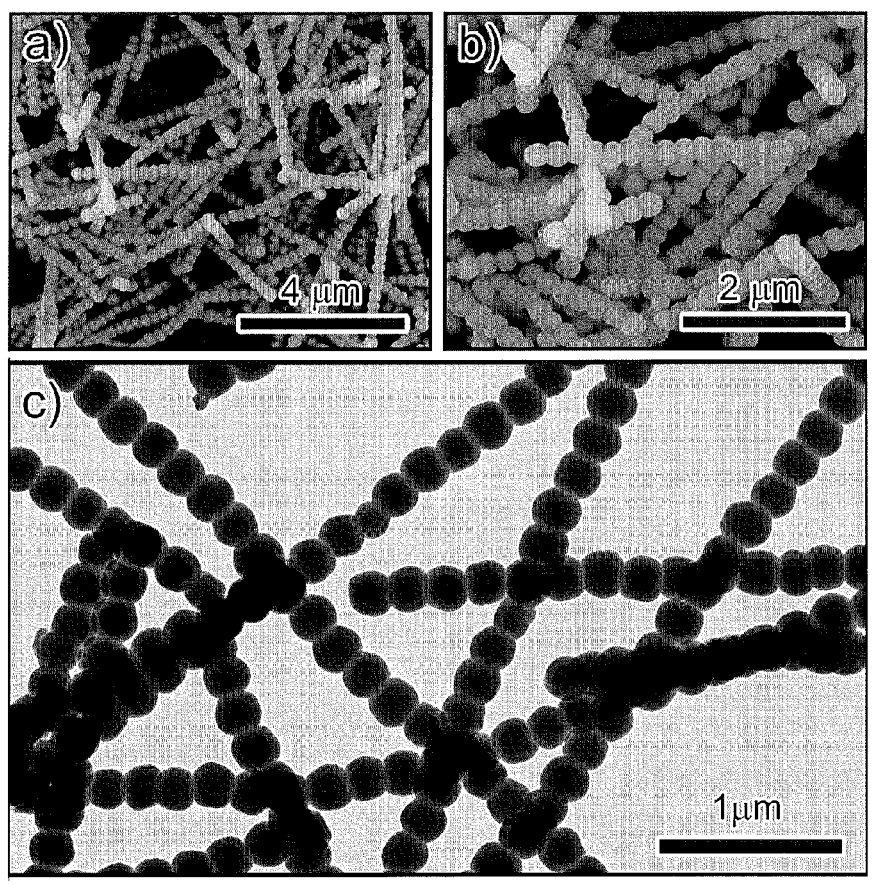
FIG. 2 shows a & b) SEM and c) TEM images of typical photonic nanochains. The particle chains are permanently fixed by silica coating so that they remain stable when dispersed in solution or dried on solid substrates.

The chain structure has been characterized by using both scanning (SEM) and transmission electron microscopy (TEM). As shown in FIGS. 2a and 2b, the product deposited on a silicon substrate clearly shows 1D chain structures, which appear in the form of many linearly connected spheres. The core-shell structure can be better observed in the TEM image in FIG. 2c. The periodically arranged $Fe_3O_4$ cores and the smooth silica coating can be identified by the contrast between the core and the shell. Note that the magnetic cores are not in direct contact with each other, confirming the initial silica deposition before the chain formation.

Figure 3:
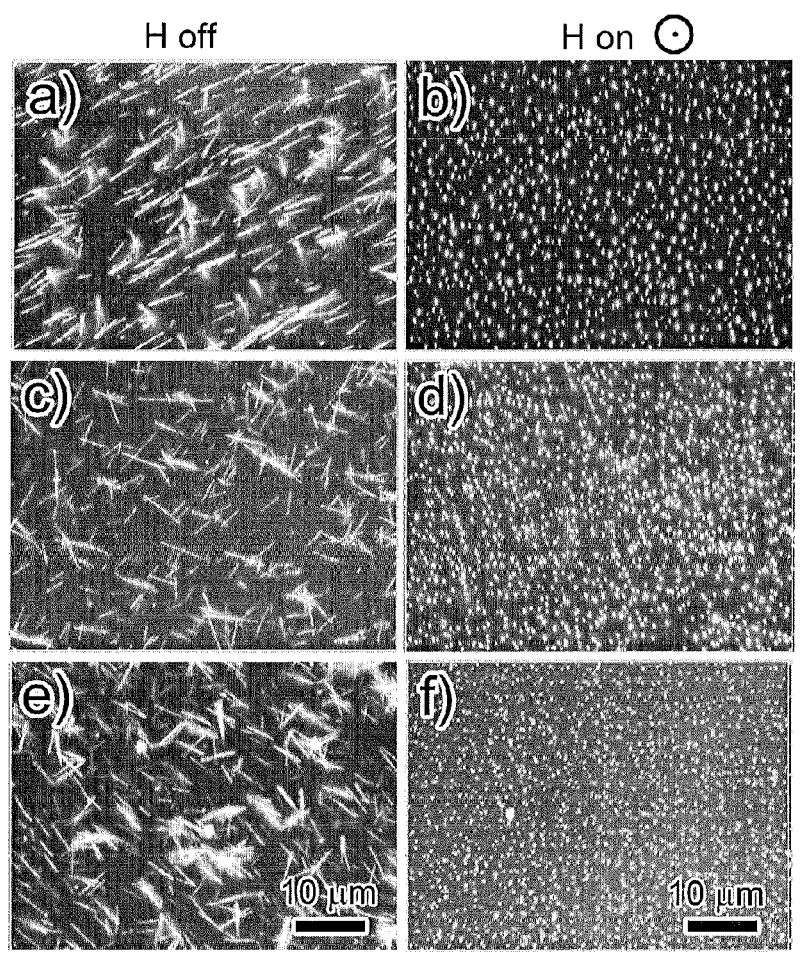
FIG. 3 shows dark-field optical microscopy images of magnetic photonic chains with different diffraction colors switched between "off" (a, c, e, without magnetic field) and "on" (b, d, f, with vertical magnetic field) states. These photonic chains diffract at different wavelengths because they were prepared using $Fe_3O_4$ CNCs of different average sizes: (a, b) 182 nm; (c, d) 160 nm; (e, f) 113 nm. All images are at the same scale.

The photonic chains can diffract visible light and display brilliant colors owing to the periodic arrangement of the $Fe_3O_4$ particles. In the absence of external magnetic fields, the chains are randomly oriented so that their bulk solution only shows the native brown color of iron oxide. When an external field is applied, all the chains are aligned along the field direction so that the dispersion shows distinctive colors. In accordance with an exemplary embodiment, an optical microscope operated in dark-field mode was used to observe the magnetic alignment of the chains and the corresponding photonic response. As shown in FIG. 3, without the influence of a magnetic field the chains are randomly dispersed in solution so that no uniform colors can be observed. When a vertical magnetic field is applied, all of the chains align along the field direction and appear as brightly colored dots to the viewer. All the photonic chains within one sample show a single color because the particles arrange in the same periodicity.

Similar to the magnetic particle arrays, the diffraction wavelength of the photonic chains can be controlled through the periodicity of the particle arrays. A convenient way to change the periodicity is to use $Fe_3O_4$ CNCs of different sizes. As shown in FIG. 3, photonic chains assembled from large CNCs (approximately 182 nm in diameter) diffract red light, while those from medium-sized particles (approximately 160 nm) diffract green light and those from small CNCs (approximately 113 nm) preferably diffract blue light. Uniform CNCs can be produced with average diameters ranging from approximately 30 to 200 nm, so it should be possible to produce photonic chains with diffraction wavelengths across a wide range of spectrum from near UV to near IR.

Figure 4:
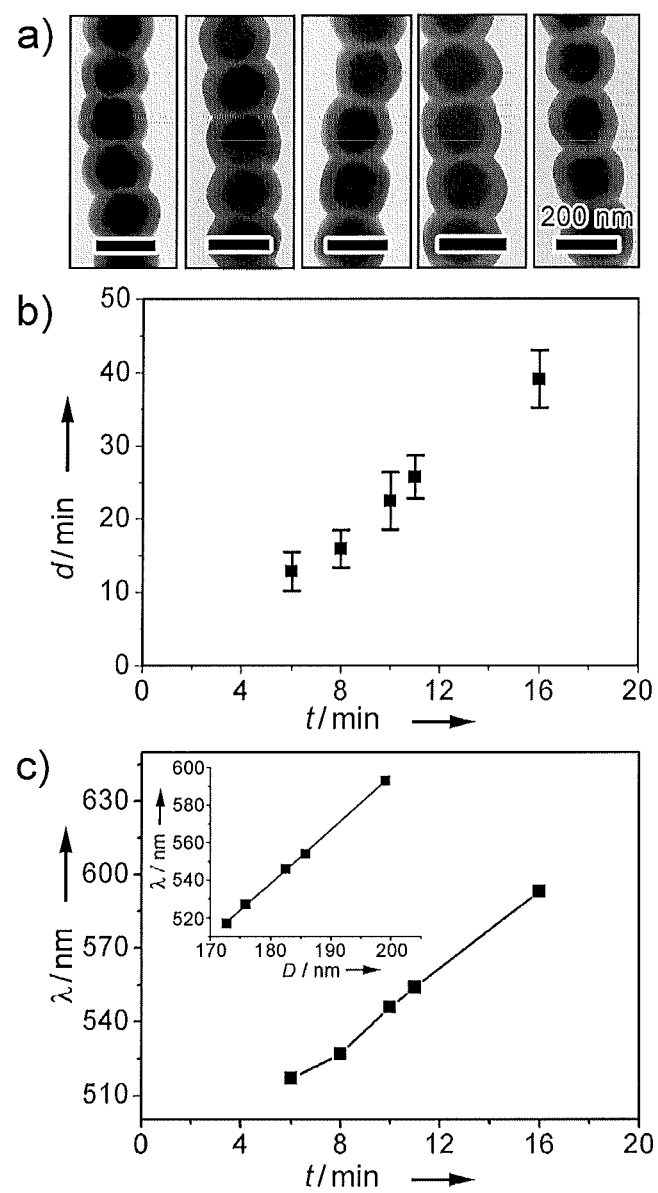
FIG. 4 shows a) representative TEM images of photonic chains with different interparticle separation controlled by applying magnetic fields at different times after injecting TEOS (left to right): 6 min; 8 min; 10 min; 11 min; 16 min. All scale bars correspond to 200 nm. b) The dependence of interparticle separation (d) on the timing of magnetic exposure (t). c) The dependence of diffraction wavelength of the photonic chains on the timing of magnetic exposure. The inset plots the diffraction wavelength against the periodicity (D) of the photonic chains.

The timing of magnetic field exposure is critically important to the success of the chain fixing. The magnetic field needs to be applied when the surface of the $F_3O_4$ has been covered with a thin silica layer, which is typically approximately 5 min after the addition of TEOS. Exposing the dispersion to magnetic field too early will result in large irregular aggregates because of the low dispersity of the particles in solution. On the other hand, exposure to magnetic field must be carried out before the particles gain high dispersity in solution, which typically occurs when the thickness of the silica layer is above 20 nm. Otherwise, the particle chains temporarily formed by brief magnetic exposure cannot be maintained during the subsequent additional silica coating. In addition, controlling the timing of magnetic exposure also allows for the fine-tuning of the interparticle spacing within photonic chains. Because silica deposition is a slow and continuous process, the thickness of the initial silica layer varies when the magnetic field is applied at different times. If the magnetic field is applied at a later stage, a relatively thicker silica layer is deposited, resulting in a larger interparticle spacing and subsequently diffraction at a longer wavelength. FIG. 4a shows TEM images of photonic chains produced from CNCs with a diameter of approximately 160 nm by applying external magnetic fields at different times. The interparticle separation gradually increases when the timing of magnetic exposure changes from 6 to 8, 10, 11 and 16 min after injecting TEOS. FIGS. 4b and 4c summarize the interparticle separation (d) and the diffraction wavelength (λ) of these five samples. The application of a magnetic field at an early stage (6 min) results in a thin layer of silica between neighboring particles (d=12.8 nm) and thereby diffraction at a relatively short wavelength (approximately 517 nm). When the magnetic field is applied at a later stage (16 min), the interparticle separation increases to approximately 39.1 nm and the diffraction red-shifts to approximately 593 nm. According to Bragg's equation, the diffraction wavelength is proportional to the periodicity (D): $\lambda=2nD$ (at normal incidence of light). This is verified by plotting $\lambda$ against D in the inset in FIG. 4c, which reveals a perfect linear relationship. The effective refractive index (n) of the system calculated from the slope of the linear fit of the plot is 1.43. Because the chain structure cannot be retained when the initial silica coating is beyond 20 nm in thickness, the silica layer between neighboring CNCs can only be tuned within the limit of approximately 10-40 nm with the corresponding diffraction peak shift in the range of approximately 80 nm.

Figure 5:
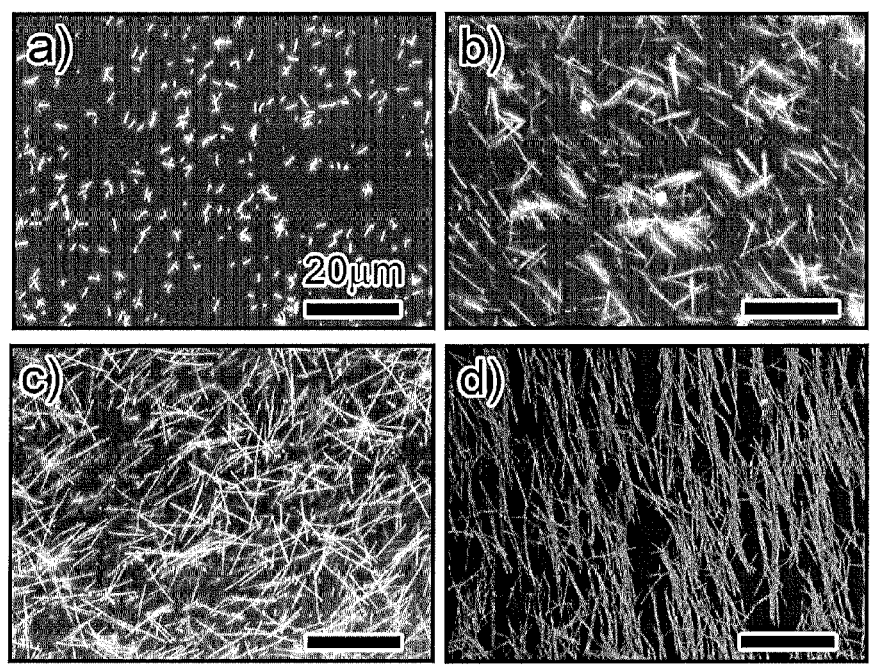
FIG. 5 shows dark-field optical microscopy images of photonic chains with different lengths obtained by applying a magnetic field for different durations: a) 0.5 s; b) 1 s; c) 2 s; d) 4 s. The field strength of magnetic exposure is estimated at approximately 570 G (gauss) and field gradient approximately 197 G/cm. All images are at the same scale.

The chain length can be tuned over a range of two to tens of micrometers by adjusting the magnetic field duration from approximately 0.5 second to approximately 4 seconds, as shown in FIG. 5. Upon a very brief exposure (0.5 seconds) to external field, the $Fe_3O_4$ CNCs only assemble locally to form short chains two micrometers in length (FIG. 5a). Increasing the field duration allows more extensive particle assembly and chain recombination, producing longer chains with lengths of several tens of micrometers (FIGS. 5b-5d). Retaining the dispersion in the magnetic field for even longer times leads to random aggregation of the chains.

Since photonic chains contain many magnetic particles, they show high sensitivity to external magnetic fields. In accordance with an exemplary embodiment, a measurable reflection was observed with an intensity of 4.5% due to partial chain alignment upon the application of a low magnetic field of only approximately 4 G, while in previously reported unfixed system, a minimum of 50 G is typically required for observable diffraction because magnetic particles first need to be assembled from the dispersed form into periodic arrays. In the current system, a magnetic field of 50 G is sufficient to align all the photonic chains along the field direction, producing diffraction with a maximum intensity. Because the switching of the diffraction only involves chain rotation, it can be accomplished rapidly (within a second) and reversibly in a sufficiently strong magnetic field (>50 G). Another feature of the current system is the optical stability. The photonic chains remain separated from each other in magnetic fields due to the magnetic repulsive force perpendicular to the field direction. A stable diffraction (in both intensity and wavelength) was observed over a period over 4 hours for photonic chains aligned in a magnetic field of 50 G.

In summary, a simple but effective solution phase process for the fabrication of magnetically responsive photonic nanochains has been developed, each of which is composed of an array of magnetic $Fe_3O_4$ particles fixed within a silica shell. These photonic chains can be aligned in magnetic fields and diffract visible light. The key of the fabrication process is to induce chaining of the uniform magnetic particles during their silica coating process and then allow additional deposited silica to wrap entire chains into mechanically robust rods/wires. The diffraction wavelength of these photonic chains can be tailored across the visible spectrum by using magnetic particles of different sizes. The interparticle separation and the chain length can also be conveniently controlled by adjusting the timing and duration of applied magnetic field, respectively. The convenient control over the chain structure, nanoscale size of each diffracting unit, fast on/off switching of the diffraction state in response to external fields, tolerance to environmental variances, and excellent mechanical and optical stability make these photonic nanochains promising for many potential applications such as bio- and chemical sensing, labeling, and energy efficient color displays.

EXPERIMENTAL SECTION

Superparamagnetic $Fe_3O_4$ CNCs were synthesized using a high-temperature hydrolysis reaction have been previously reported. In a typical synthesis of photonic chains, 3 mL of aqueous solution of CNCs (ca. 8.6 mg $Fe_3O_4$/1 mL $H_2O$) was dispersed in a mixture of $NH_4OH$ (1 mL) and ethanol (20 mL) under sonication. TEOS (170 µL) was quickly injected after the mixture was transferred into a three-neck flask under mechanical stirring at 600 rpm. After 12 min, 2 mL of the mixture was transferred to a glass vial (23×85 mm) and placed above a 3"×¼" Neodymium disc magnet at a distance of 4 cm for 1 second. After removal from the magnetic field the sample was allowed to sit undisturbed for another 15 min, after which it was washed with ethanol 3 times and redispersed in ethanol (4 mL).

The diffraction spectra were measured by an Ocean Optics HR 2000CG-UV-NIR spectrometer coupled with a six-around-one reflection/backscattering probe. The spectra integration time of collecting the signals was set to be 500 ms.

It will be apparent to those skilled in the art that various modifications and variation can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method of fabricating individually fixed nanochains with a magnetically responsive photonic property comprising:
    coating a plurality of colloidal nanoclusters with a layer of silica;
    applying a magnetic field to the plurality of colloidal nanoclusters to assemble the colloidal nanoclusters into one or more photonic chains; and
    overcoating an entirety of each of the one or more photonic chains with an additional layer of silica, which fixes the entirety of each of the one or more photonic chains within a silica shell.

2. The method of claim 1, wherein the colloidal nanoclusters are superparamagnetic iron oxide ($Fe_3O_4$) nanocrystal clusters.

3. The method of claim 1, wherein the step of applying the magnetic field is performed during the coating of the plurality of colloidal nanoclusters with the layer of silica, wherein the layer of silica is an initial layer of silica.

4. The method of claim 1, wherein the one or more photonic chains are rods and/or wires.

5. The method of claim 1, comprising:
    using colloidal nanoclusters of one or more diameter and/or sizes.

6. The method of claim 1, comprising:
    adjusting a timing of applying the magnetic field to the colloidal nanoclusters to control interparticle spacing between the plurality of colloidal nanoclusters.

7. The method of claim 1, comprising:
    changing a duration of the magnetic exposure to control a length of the photonic chains.

8. The method of claim 1, wherein the colloidal nanoclusters are superparamagnetic $Fe_3O_4$ colloidal nanoclusters synthesized using a high-temperature hydrolysis reaction.

9. The method of claim 8, wherein the synthesis of the photonic chains comprises:
an aqueous solution of colloidal nanoclusters dispersed in a mixture of $NH_4OH$ and ethanol under sonication.

10. The method of claim 9, comprising:
transferring the mixture into a flask under mechanical stirring and injecting TEOS into the mixture.

11. The method of claim 10, comprising:
transferring the mixture to a glass vial and placing the mixture above a Neodymium disc magnet.

12. The method of claim 11, comprising:
removing the magnetic field and allowed the mixture to sit undisturbed and washing the mixture with ethanol and redispersing the mixture in ethanol.

13. The method of claim 1, wherein the magnetic field has a strength of approximately 570 G for particles having a diameter of approximately 160 nm.

14. The method of claim 1, wherein the step of applying the magnetic field to the plurality of colloidal nanoclusters to assemble the colloidal nanoclusters is performed during the step of coating the plurality of colloidal nanoclusters and before the additional layer of silica, which wraps each of the one or more photonic chains into rods and/or wires.

15. A method of fabricating individually fixed nanochains with a magnetically responsive photonic property comprising:
coating a plurality of colloidal nanoclusters with a layer of silica;
applying a magnetic field to the plurality of colloidal nanoclusters having an initial layer of silica of less than 20 nm, and wherein the plurality of colloidal nanoclusters assemble into one or more photonic chains; and
overcoating each of the one or more photonic chains with an additional layer of silica, which fixes and wraps each of the one or more photonic chains within a silica shell.

16. The method of claim 15, comprising:
using colloidal nanoclusters of one or more diameter and/or sizes.

17. The method of claim 15, comprising:
adjusting a timing of applying the magnetic field to the colloidal nanoclusters to control interparticle spacing between the plurality of colloidal nanoclusters.

18. The method of claim 15, comprising:
changing a duration of the magnetic exposure to control a length of the photonic chains.

19. The method of claim 15, wherein the colloidal nanoclusters are superparamagnetic $Fe_3O_4$ colloidal nanoclusters synthesized using a high-temperature hydrolysis reaction.

20. The method of claim 15, wherein the colloidal nanoclusters are superparamagnetic iron oxide ($Fe_3O_4$) nanocrystal clusters, and the one or more photonic chains are rods and/or wires.

* * * * *